United States Patent [19]

Raymond

[11] Patent Number: 4,947,977
[45] Date of Patent: Aug. 14, 1990

[54] APPARATUS FOR SUPPLYING ELECTRIC CURRENT AND COMPRESSED AIR

[76] Inventor: William S. Raymond, 14413 Tipperary Cir., Wichita, Kans. 67230

[21] Appl. No.: 275,946

[22] Filed: Nov. 25, 1988

[51] Int. Cl.⁵ ............................................. F16D 43/06
[52] U.S. Cl. ........................ 192/103 B; 192/105 CD; 192/48.91
[58] Field of Search ................... 192/103 B, 72, 104 B, 192/104 C, 105 CD, 48.9, 48.8, 48.1, 48.91, 79; 74/665 G, 665 K, 336 B, 336 R

[56] References Cited

U.S. PATENT DOCUMENTS

| | | | |
|---|---|---|---|
| 2,883,611 | 4/1959 | Fuge | 322/32 X |
| 2,885,625 | 5/1959 | Pittman | 322/40 X |
| 3,283,165 | 11/1966 | Bloch | 322/40 X |
| 4,525,661 | 6/1985 | Mucsy | 322/4 |

FOREIGN PATENT DOCUMENTS

| | | | |
|---|---|---|---|
| 0562465 | 5/1957 | Italy | 192/105 CD |
| 0646486 | 10/1962 | Italy | 192/105 CD |

Primary Examiner—Rodney H. Bonck
Assistant Examiner—Andrea Pitts
Attorney, Agent, or Firm—John W. Carpenter

[57] ABSTRACT

An energy source apparatus which will supply current and compressed air. The energy source apparatus has an engine, a drive shaft engaged to the engine, and a face plate that is bound to the drive shaft in order to rotate therewith. A clutch is pivotally mounted to the face plate such as to respond to centrifugal force. A second drive shaft has an end rotatably positioned within the clutch such that the outside circumferential surface of the end of the second drive shaft is engaged by inner clutch pads of the clutch. A third drive shaft has a hollow end which is positioned around the clutch apparatus such that when the engine rotates the face plate at high speeds, centrifugal force causes outer clutch pads of the clutch to engage with the hollow end of the third drive shaft. A generator is engaged to the third drive shaft to be driven thereby. An air compressor is engaged to the second drive shaft in order to be driven thereby too.

10 Claims, 4 Drawing Sheets

APPARATUS FOR SUPPLYING ELECTRIC CURRENT AND COMPRESSED AIR

BACKGROUND OF THE INVENTION

1. Field of the Invention

This invention is related to an energy source apparatus which will supply electric current and compressed air. More specifically, this invention provides a novel clutch which is engaged to an engine in order to drive a series of shafts which engage an electric generator and an air compressor.

2. Description of the Prior Art

U.S. Pat. No. 4,525,661 to Mucsy et al. teaches a standby energy source having an engine which may drive a pump and a generator through a gear drive. U.S. Pat. No. 3,283,165 by Block discloses an engine driven alternator that is connected to the engine by means of a clutch. U.S. Pat. No. 2,883,611 by Fuge teaches an engine driven power system wherein a gear unit, a generator, an electromagnetic slip clutch, an alternator, a motor and a refrigeration unit may all be driven. U.S. Pat. No. 2,885,625 to Pittman Jr. teaches an electric measurement and control device having a motor driving a stationary electric motor, an AC generator which is coupled to a variable ratio device. The variable ratio device is coupled to a ratio controller and to an engine. None of the foregoing prior art teach or suggest the particular clutch of this invention, nor the particular energy source means or apparatus which will supply electric current and compressed air, of this invention.

SUMMARY OF THE INVENTION

It is therefore an object of the present invention to provide a clutch. It is another object of the present invention to provide a clutch that is a reversed centrifugal clutch.

It is yet another object of the present invention to provide a standby energy source which will supply alternating current and/or direct current, as well as compressed air.

Still other objects will be apparent to those skilled in the art from the following description of the invention.

The foregoing objects are achieved according to the practice of this invention. Broadly, this invention comprises an energy source means which will supply electric current and compressed air. The energy source means has a drive means, a first drive shaft means engaged to the drive means in order to be rotated thereby, and a face plate means bound to the first drive shaft means in order to rotate therewith. A clutch means is pivotally mounted to the face plate means such as to respond to centrifugal force.

The clutch means of this invention comprises a first generally semi-circular clutch body that terminates at one end into a first lug means having a first lug aperture and a first lug recess. The first clutch body terminates at another end into a first tongue. A first bolt slidably passes through the first lug aperture and engages the face plate means such that the face clutch body pivots about the first bolt with centrifugal force. The first generally semi-circular clutch body has a structure defining a first web support means integrally bound to an arcuate first flange means having a first arcuate flange surface and a first lower arcuate flange surface. A first outer clutch pad means is attached first upper arcuate flange surface and a first inner clutch pad means attaches to the first lower arcuate flange surface. The clutch means of this invention also comprises a second semi-circular clutch body terminating at one end into a second lug means having a second lug aperture and a second lug recess. The second clutch body terminates at another end into a second tongue. A second bolt is slidably disposed through the second lug aperture and is engaged to the face plate means such that the second clutch body pivots about the second bolt with centrifugal force. The second generally semi-circular clutch body has a structure defining a second web support means integrally bound to an arcuate second flange means having a second upper arcuate flange surface and a second lower arcuate flange surface. A second outer clutch pad means is attached to the second upper arcuate flange surface and a second inner clutch pad means is attached to the second lower arcuate flange surface. At least one spring means is connected to the first generally semi-circular clutch body and to the second generally semicircular clutch body for biasing the first clutch body and the second clutch body together in a generally circular configuration.

The energy source means for supplying electric current and compressed air additionally comprises a second drive shaft means having an end rotatably positioned within the circular configuration such that the outside circumferential surface of the end of the second drive shaft means is engaged by the first inner clutch pad means and the second inner clutch pad means when the face plate means is being rotated at low revolutions by the drive means. A third drive shaft means having a hollow structure is concentrically positioned around the second drive shaft means. The third drive shaft means has a hollow end rotatably positioned around the circular configuration such that the inside circumferential surface of the hollow end of the third drive shaft means is engaged by the first outer clutch pad means and the second outer clutch pad means when the face plate means is being rotated at high revolutions by the drive means. A generator means is engaged to the third drive shaft means to generate electricity, and an air compressor means is engaged to the second drive shaft means to compress air.

DETAILED DESCRIPTION OF THE DRAWINGS

Figure 1:
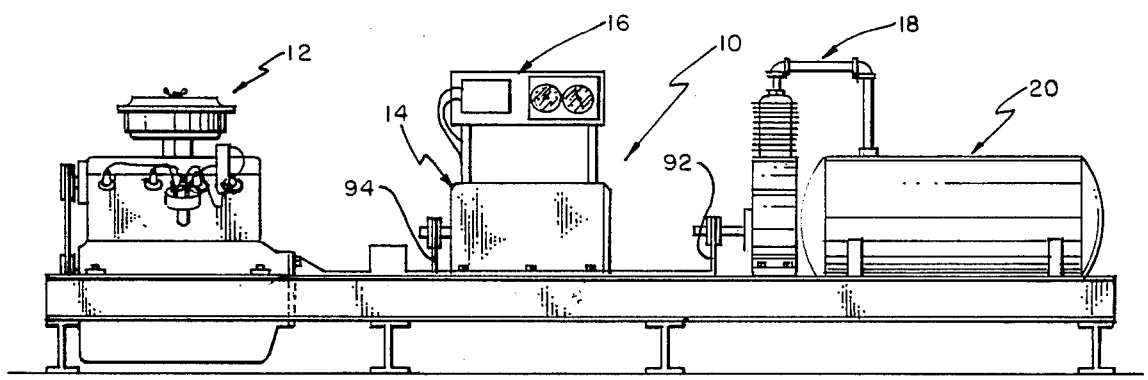
FIG. 1 is a side elevational view of the energy source means for supplying electric current and compressed air.
Figure 2:
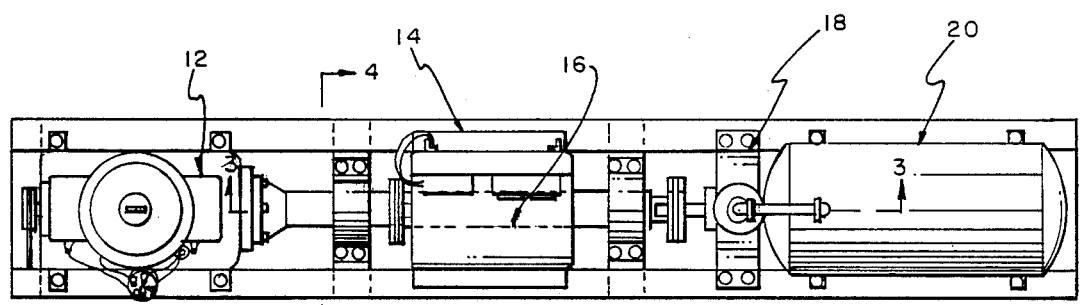
FIG. 2 is a top plan view of the energy source means of FIG. 1.
Figure 3:
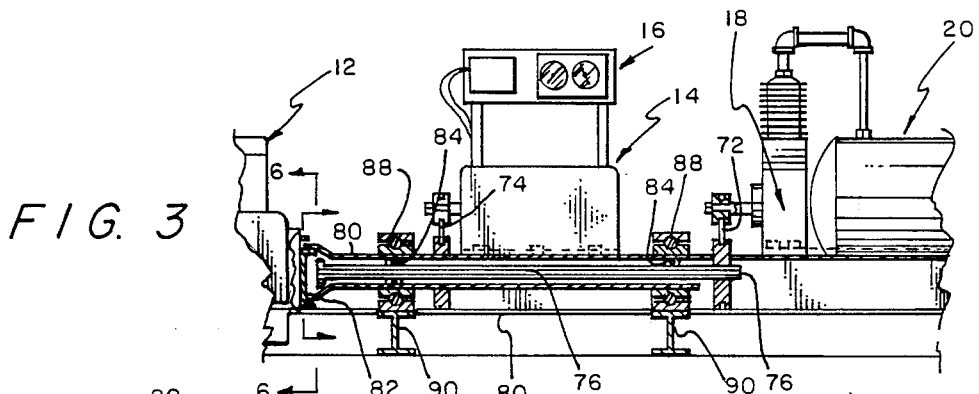
FIG. 3 is a vertical sectional view taken in direction of the arrows and along the plane of line 3—3 in FIG. 2.
Figures 4, 5:
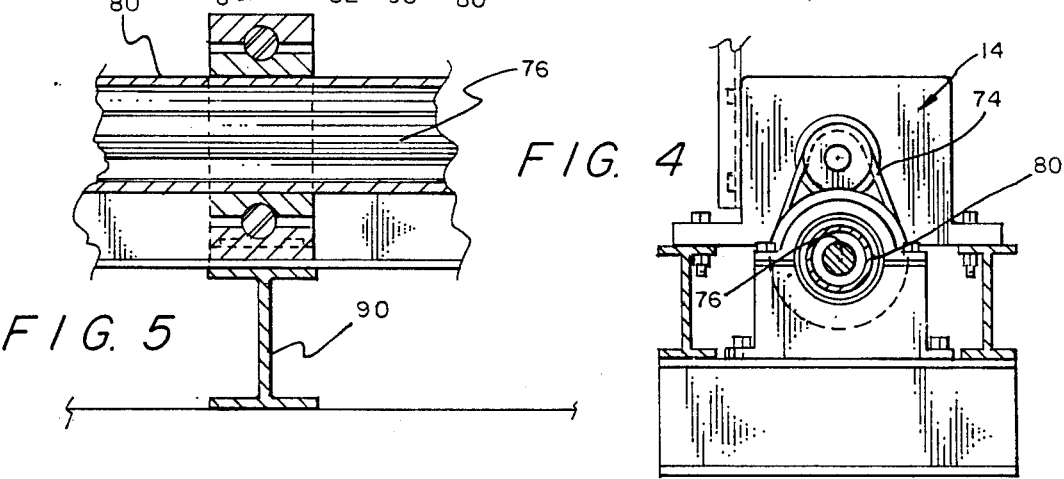
FIG. 4 is a vertical sectional view taken in direction of the arrows and along the plane of line 4—4 in FIG. 2.
FIG. 5 is an enlarged partial vertical sectional view disclosing the outer shaft rotatably mounted on bearings that are supported by bearing support structure and an inner shaft rotatably positioned within the outer shaft.
Figure 6:
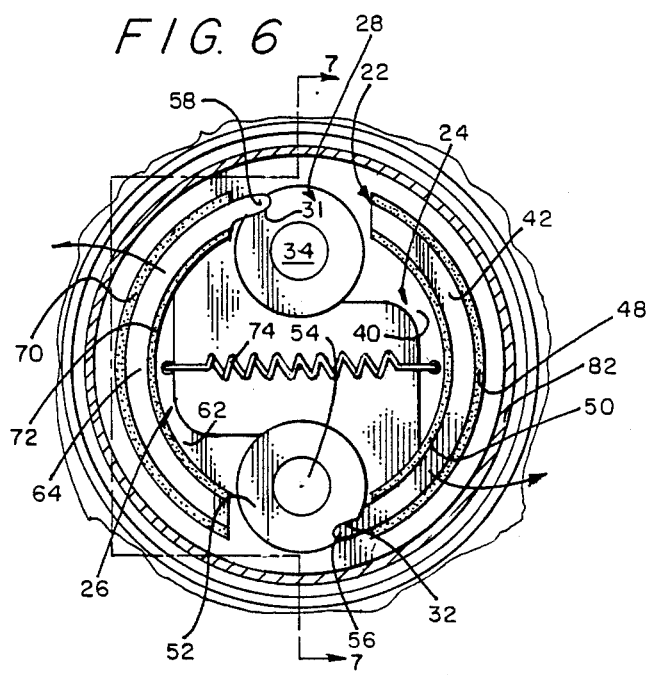
FIG. 6 is a vertical sectional view taken in direction of the arrows and along the plane of line 6—6 in FIG. 3.
Figure 7:
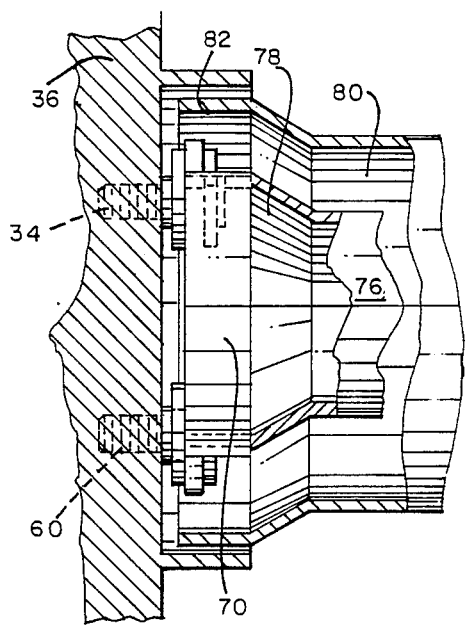
Figure 8:
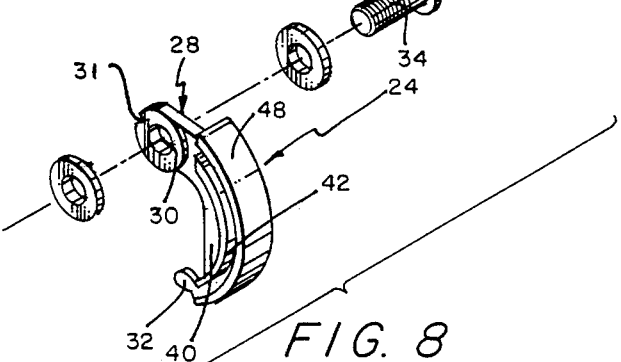
Figure 9:
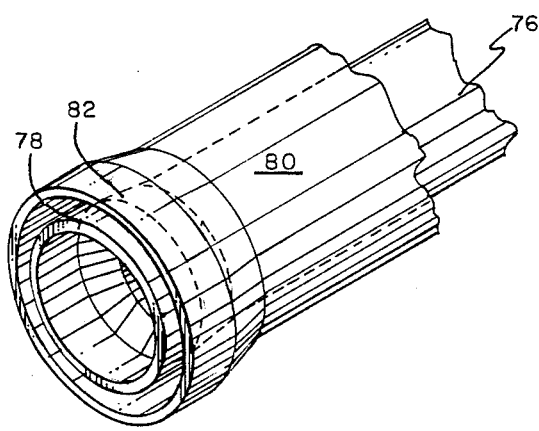
Figure 10:
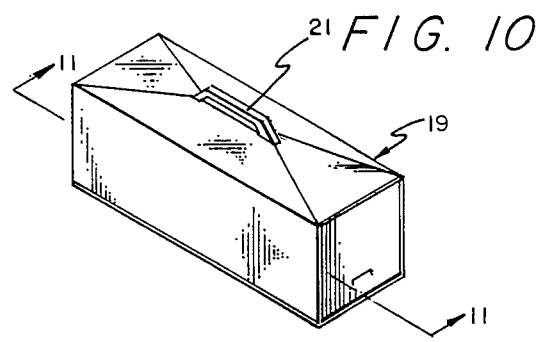
Figure 11:
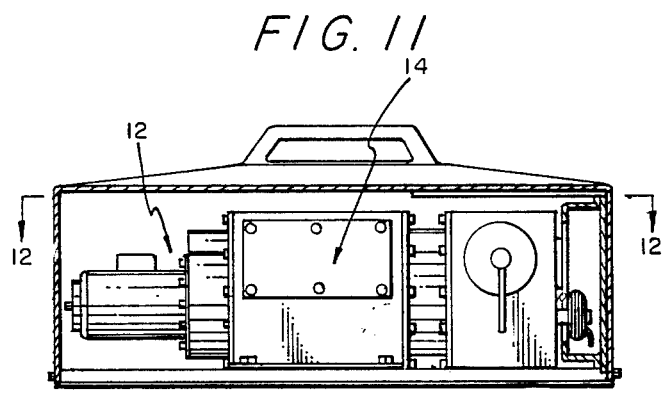
Figure 12:
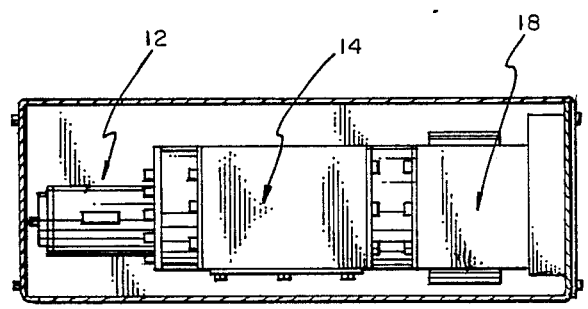
Figure 13:
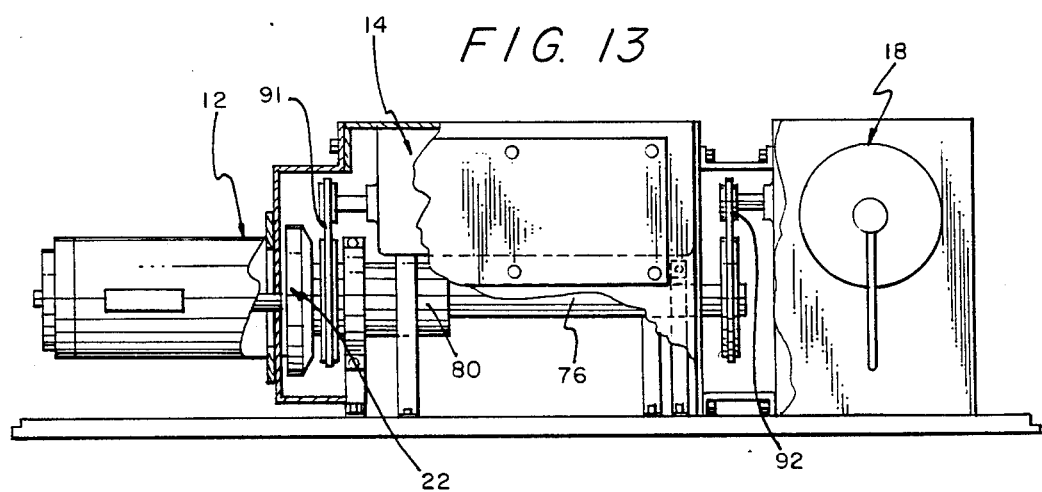
Figure 14:
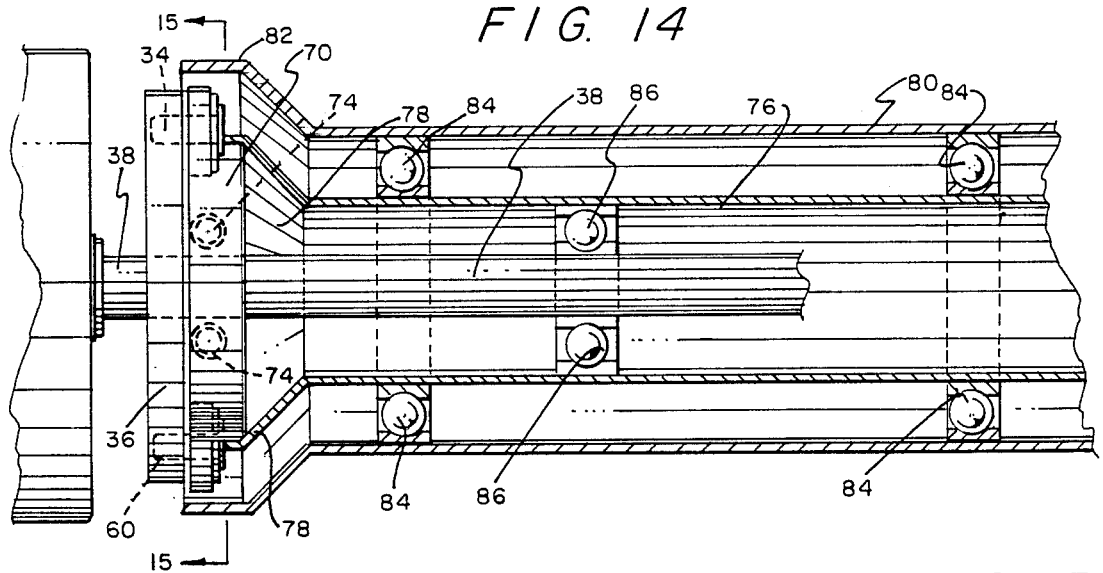
Figure 18:
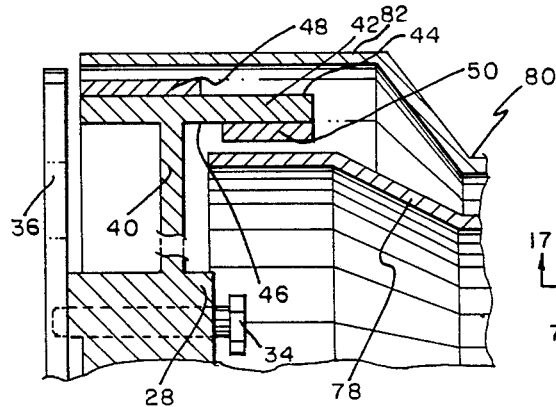
Figure 15:
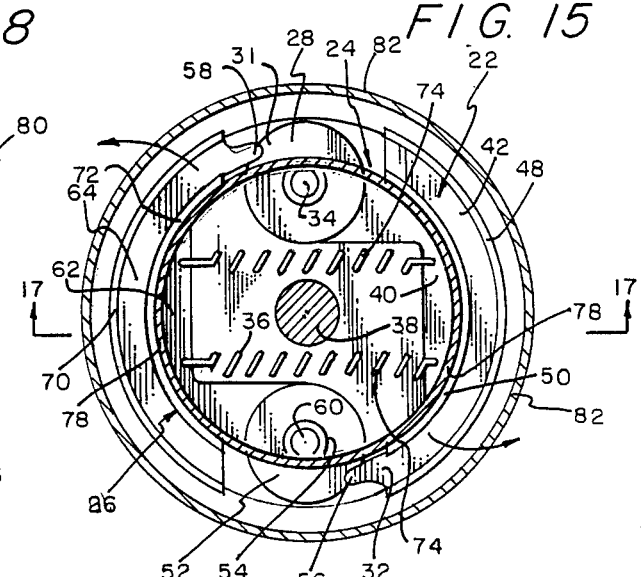
Figure 16:
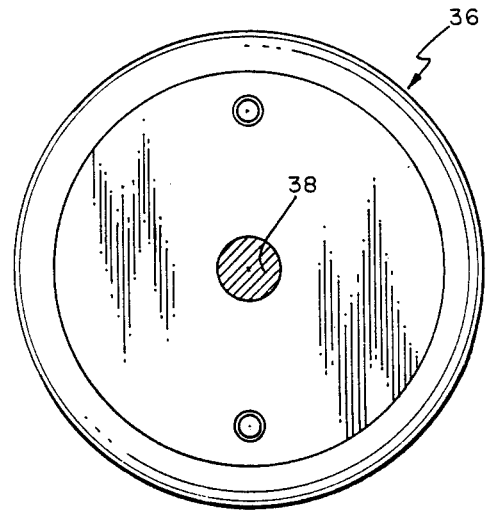
Figure 17:
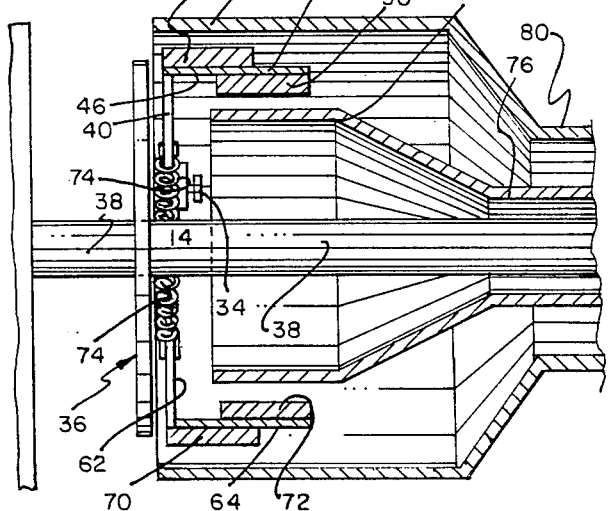

FIG. 7 a partial vertical sectional view taken in direction of the arrows and along the plane of line 7—7 in FIG. 6;

FIG. 8 is an exploded perspective view of one of the clutch bodies that comprise the clutch of this invention;

FIG. 9 is a partial perspective view of the flared ends of the outer hollow shaft and the inner hollow shaft that is concentrical positioned with respect to the outer hollow shaft;

FIG. 10 is a perspective view of a portable energy source means which will supply electric current and compressed air;

FIG. 11 is a vertical sectional view taken in direction of the arrows and along the plane of line 11—11 in FIG. 10;

FIG. 12 is a horizontal sectional view taken in direction of the arrows and along the plane of line 12—12 in FIG. 11;

FIG. 13 is an enlarged front elevational view of the portable energy source means of this invention which may provide electricity along with compressed air;

FIG. 14 is a partial enlarged vertical sectional view disclosing the clutch means of this invention having a pair of springs along with a drive shaft that passes between the pair of springs and is rotatable within the hollow inner drive shaft;

FIG. 15 is a vertical sectional view taken in direction of the arrows and along the plane of line 15—15 in FIG. 14;

FIG. 16 a front elevational view of the face plate which is integrally bound to a drive shaft that is connected to an engine;

FIG. 17 is a vertical sectional view taken in direction of the arrows and along the plane of line 17—17 in FIG. 15; and FIG. 18 is a partial vertical sectional view of the clutching apparatus of this invention wherein the arcuate flanged support surface is offset with respect to the web support surface such that the underside surface of the arcuate flange surface has an inner pad attached thereto in order to engage an inner shaft and the top side of the arcuate flange surface has mounted thereon an outer pad which engages an outer shaft.

DETAILED DESCRIPTION OF THE INVENTION

Referring in detail now to the drawings wherein similar parts of the invention are identified by like reference numerals, there is seen the energy source means, generally illustrated as 10, which could supply electric current and/or compressed air. The energy source means (or apparatus) 10 includes an engine, generally illustrated as 12, and a generator, generally illustrated as 14, having mounted thereon a voltage regulator, generally illustrated as 16. The energy source apparatus 10 additionally includes an air compressor 18 that compresses air that is stored in a tank, generally illustrated as 20.

Referring briefly now to the portable energy source means 10 of this invention, FIGS. 10-13 disclose the engine 12, the generator 14, and the air compressor 18. The portable energy source apparatus 10 of FIGS. 10-13 are encased in a cover 19 that includes a handle 21 in order to transport the portable energy source apparatus 10. The portable energy source apparatus 10 of FIGS. 10-13 also includes the voltage generator of 14 which is not readily seen in FIGS. 10-13. Whenever the engine 10, generator 12, voltage regulator 14, and air compressor 16 are referred to hereafter, it should be understood that such references may be to the embodiments of FIGS. 1-4 or the portable embodiment of FIGS. 10-13, unless otherwise stated. All aspects of the present invention with respect to the energy source apparatus 10 are applicable both to the embodiments of FIGS. 1-4 as well as the portable embodiments of FIGS. 10-13.

The engine 12 is preferably an internal combustion engine 12 that drives the generator 14 to supply electrical current. The engine 12 also drives the air compressor 18 as will be more specifically detailed and discussed below. Furthermore, due to the various speeds of operations, there will be an uncontrolled variance in voltage from the generator 14 for direct current applications. To compensate for the uncontrolled variance, the voltage regulator 16 is connected electrically to the generator 14 in order to control electrical output and set limits for safe operation of electrical current.

The energy source apparatus 10 utilizes a centrifugal clutch, that is generally illustrated as 22. The clutch 22 has a first generally semi-circular clutch body, generally illustrated as 24, and a second generally semi-circular clutch body, generally illustrated as 26. The first clutch body 24 terminates at one end into a first lug means, generally illustrated as 28. First lug 28 has a first lug aperture 30 and a first lug recess 32 (see FIG. 8). The other end of the first generally semi-circular clutch body 24 terminates into a first tongue 32. A first bolt 34 is slidably disposed through the first lug aperture 30 and is threadably engaged to a face plate means, generally illustrated as 36 (see FIG. 16) which is mounted integrally on a drive shaft 38 that is being driven by the engine 12. The first clutch body 24 pivots about the first bolt 34 with centrifugal force. The first generally semi-circular clutch body 24 has a structure defining a first web support 40 integrally bound to an arcuate first flange 42 that has an upper arcuate flange surface 44 and a lower arcuate flange surface 46 (see FIGS. 17 and 18). An outer clutch pad 48 is attached to the first upper arcuate flange surface 44. Similarly, a first inner clutch pad 50 is attached to the first lower arcuate flange surface 46.

The second generally semi-circular clutch body 26 terminates at one end into a second lug means 52 having a second lug aperture 54 and a second lug recess 56. The second generally semi-circular clutch body terminates at another end into a second tongue 58. The second generally semi-circular clutch body 26 is generally identical in size and shape as the first generally semi-circular clutch body 24 and includes the identical features as the first generally semi-circular clutch body 24. More specifically, a second bolt 60 (similar in size and shape as to the first bolt 34 in FIG. 8) is slidably disposed through the second lug aperture 54 and threadably engages the face plate 36 (see FIG. 7) such that the second clutch body 26 pivots about the second bolt 60 with centrifugal force. The second generally semi-circular clutch body 26 has a structure defining a second web support 62 integrally bound to an arcuate second flange 64 that is similar in design and shape as the arcuate first flange 42. The arcuate second flange 64 has a second upper arcuate flange surface 66 (see FIG. 17) and a second lower arcuate flange surface 68. A second outer clutch pad means 70 is attached to the second upper arcuate flange surface 66 and a second inner clutch pad means 72 is attached to the second lower arcuate flange surface 68. At least one spring 74 is connected to the first generally semi-circular clutch body 24 and to the second generally semi-circular clutch body 26 for biasing the first clutch body 24 and the second clutch body 26 together in a generally circular configuration as illustrated in FIGS. 6 and 15. More specifically, at least one spring means 74 is connected to the first web support 40 of the first clutch body 24 and to the second web support 62 of the second clutch body 26 in order to bias together two clutch bodies such that when the circular configuration is formed by the two clutch bodies 24 and 26, the first tongue 32 seats into the second lug recess 56 and the second tongue 58 seats into the first lug recess 31 when the first clutch body 24 and the second clutch body 26 are biased together in contact. As will be set forth in greater detail below, the clutching apparatus 22 of this invention has two embodiments wherein one embodiment employs only one spring means 74 (see FIGS. 6 and 7) and another embodiment employing two springs 74-74 (see FIGS. 14, 15 and 17).

In the embodiment of the invention that employs a pair of springs 74-74, the drive shaft 38 extends through the face place 36 and between the pair of springs 74-74, as illustrated in FIGS. 14, 15 and 17. In the embodiment of the clutch 22 that employs only one spring 74 (see FIGS. 6 and 7), the drive shaft 38 does not extend all the way through the face plate 36 since the single spring 74 would prevent or block such entire extension therethrough. More persuasively, the single spring 74 clutch apparatus 22 would become unsymmetrical in the clutch bodies 24 and 26 opening and closing with centrifugal force about the bolts 34 and 60 respectively, and would not function efficiently.

The energy source apparatus 10 of this invention additionally comprises a second drive shaft 76 that has an end 78 rotatably positioned within the circular configuration of the clutch bodies 24 and 26 such that the outside circumferential surface of the end 78 of the second drive shaft 76 is engaged by the first inner clutch pad 50 and the second inner clutch pad 72 when the face plate 36 is being rotated at low revolutions by the engine (see FIG. 15). In a preferred embodiment of the invention, end 78 of the second drive shaft 76 flanges outwardly as disclosed in FIGS. 7, 9, 14, 17, and 18 such that the diameter of the end 78 is larger than the diameter of the remaining part of the second drive shaft 76. Preferably, the second drive shaft 76 including its end 78 is hollow in order that the first drive shaft 38 may rotatably pass therethrough.

The energy source apparatus 10 additionally includes a third drive shaft 80 having a hollow structure and concentrically positioned around the drive shaft 76. The drive shaft 80 has a hollow end 82 that is rotatably positioned around the circular clutch configuration that is made up of clutch bodies 24 and 26, such that the inside circumferential surface of the hollow end 82 of the drive shaft is engaged by the first outer clutch pad 48 and the second outer clutch pad 70 when the face plate 36 is being rotated at high revolutions by the engine 12. Between drive shaft 80 and drive shaft 76 are a plurality of bearings 84 in order to support drive shaft 76 as it rotates inside of drive shaft 80 and to keep drive shaft 76 concentric and generally aligned with respect to drive shaft 80. In the embodiment of the invention wherein the drive shaft 38 extends outwardly and into the drive shaft 76 as depicted in FIGS. 14, 15 and 17, the drive shaft 38 is supported within the drive shaft 76 by bearings 86 which keeps drive shaft 38 generally concentric and aligned with respect to drive shaft 76. The outside of drive shaft 80 is rotatably supported by bearings 88 that are mounted on a bearing support 90 (see FIGS. 3 and 5). Bearings 88 support and keep drive shaft 80 essentially aligned with respect to the circular clutch configuration that comprises clutch body 24 and clutch body 26. The air compressor 18 is engaged or connected to the drive shaft 76 through an endless belt 92, or the like, in order to take rotary power from the drive shaft 76 which will run the air compressor 18. The generator 14 is connected or is engaged to the drive shaft 80 through an endless belt 94. Endless belt 94 imparts rotary power to the generator after receiving the rotary power from the drive shaft 80.

Each of the clutch bodies 24 and 26 has two embodiments other than the embodiment of having either one spring 74 or a pair of springs 74-74. More specifically, in one embodiment for each of the clutch bodies 24 and 26, the arcuate first flange 42 and the arcuate second flange 64 are off-set from the first web support 40 and the second web support 62, respectively (see FIG. 18). As illustrated in FIG. 18, with such an off-set, one side of the arcuate first flange 42 and the arcuate second flange 64 extend from the first web support 40 and the second web support 62, respectively, further or a greater distance from the first web support 40 and the second web support 62, respectively, than the other side of the respective arcuate first flange 42 and arcuate second flange 64. Such an off-set facilitates the engagement of the inner clutch pads 50 and 72 with the end 78 of the drive shaft 76. End 78 is surrounded by the circular clutch configuration and engages the outside surface of the end 78 at low revolutions when the at least one spring 74 can bias the two clutch bodies 24 and 26 together such that the inner clutch pads 50 and 72 become frictionally engaged with the outside surface of the end 78. At such low revolution, there is little centrifugal force to separate respectively the first clutch body 24 and the second clutch body 26 in direction of the arrows shown in FIG. 6 and FIG. 15. The first clutch body 24 and the second clutch body 26 respectively pivot about bolt 34 and bolt 60 when there is large centrifugal force due to the high revolutions of the face plate 36. Revolution of the face plate 36 in a counterclockwise direction enables the first clutch body 22 and the second clutch body 26 to flare outwardly and pivot about bolts 34 and 60 respectively in direction of the arrows from the counterclockwise centrifugal force. At high revolutions when the first clutch body 24 and the second clutch body 26 respectively pivot about bolts 34 and 60, the clutch bodies 24 and 26 pivot outwardly in direction of the arrows in FIG. 15 such that the outer clutch pads 48 and 70 can engage the inside circumferential surface of the hollow end 82 of the drive shaft 80. In the embodiment of the clutch 22 in FIG. 17, the first arcuate flange 42 and the first web support 40 are essentially L-shaped in vertical cross-section. Similarly, as also depicted in FIG. 17, the second arcuate flange 64 and the second web support 62 are essentially L-shaped in vertical cross-section. Thus, with such embodiments of the first clutch body 24 and the second clutch body 26, the speed of the engine 12 will dictate which drive shaft (i.e. drive shaft 76 or drive shaft 80) is being rotated. If the engine is accelerated such that the face plate 36 is revolving at high speeds, then the outer clutch pads 48 and 70 will be engaged with the inside circumferential surface of the hollow end 82 of the drive shaft 80; and with such an engagement, the drive shaft 80 is being rotated and the generator 16 is being run through the endless belt 94 connection with the drive shaft 80. If the engine 12 is operating at low speeds such that the face plate 36 is revolving at low revolutions, the at least one spring 74 has enough strength to overcome the centrifugal force and bias the two clutch bodies 24 and 26 together such that the inner clutch pads 50 and 72 will engage the outer circumferential surface of the end 78 of the drive shaft 76; and with such an engagement, the drive shaft 76 is being rotated and the air compressor 18 is being run through the endless belt connection 92 with the drive shaft 76. It should be noted that the speed of the engine 12 may be set to run at a medium speed such that the outer clutch pads 48 and 70 do not engage the inside circumferential surface of the hollow end 82 of the drive shaft 80, and the inner clutch pads 50 and 72 are not contracted or pulled against the outside circumferential surface of the end 78 of the drive shaft 76. At such medium speeds, none of the drive shafts 76 or 80 are revolving and the energy source apparatus 10 of this invention is basically in a neutral position. It should be further noted that in the embodiment of the invention that employs the drive shaft 38 extending between the pair of springs 74-74 and into and through the drive shaft 76 while being supported by bearings 86, this drive shaft 38 may extend beyond both drive shafts 76 and 80 in order that another mechanical device (not shown in the drawings) may be engaged to this drive shaft 38 which constantly revolves even when the energy source apparatus is in the neutral position. Thus, in this embodiment of the energy source apparatus 10, there may be provided at any particular time two revolving shafts; namely, drive shaft 38 and drive shaft 76 when the engine 12 is at low speeds and drive shaft 38 and drive shaft 80 when the engine 12 is at high speeds. When the engine 12 is at medium speeds, only drive shaft 38 is being rotated.

Thus by practice of this energy source apparatus 10 of this invention, there is provided a standby electrical energy source that is sufficient to charge a battery with ample power to operate its equipment. These applications may range anywhere from charging small batteries for starting small combustion engines to be used for tools and agricultural use to charge batteries for engines for transportational use. A common use may be using the energy source apparatus 10 to charge car batteries. Another common use will be for engines of aircraft. A further use of the energy source apparatus 10 of this invention is to serve as an air compressor to inflate tires and any objects using compressed air, for buoyancy or operations of pneumatics.

The energy source apparatus 10 of this invention also uses the internal combustion engine 12 to drive the generator 14 which will supply electric current. Internal combustion engine 12 also operates the air compressor 18 through the rotation of drive shaft 76.

As the engine 12 is started, it is in drive and clutched to via clutch 22 with the drive shaft 76 which is operating the air compressor 18 through the endless belt connection 92. The air compressor 18 is a low speed function and draws very little power from the engine 12, thus allowing the engine 12 to start easily. Running at idle, and at speeds slightly above idle, the air compressor 18 is in gear. When the engine 12 is accelerated, the clutch 22 of this invention releases the drive shaft 76 and renders the air compressor 18 inoperative. At accelerated speeds, the clutch 22 utilizes its outboard pads 48 and 70 to engage the inner circumferential surface of the hollow end 82 which causes endless belt 94 engaged therewith to run the generator 14 resulting in electrical current.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A clutch means comprising a first generally semi-circular clutch body terminating at one end into a first lug means having a first lug aperture and a first lug recess and terminating at another end into a first tongue, said first generally semi-circular clutch body having a structure defining a first web support means integrally bound to an arcuate first flange means having a first upper arcuate flange surface and a first lower arcuate flange surface; a first outer clutch pad means attached to said first upper arcuate flange surface and a first inner clutch pad means attached to said first lower arcuate flange surface; a second generally semi-circular clutch body terminating at one end into a second lug means having a second lug aperture and a second lug recess and terminating at another clutch body having a structure defining a second web support means integrally bound to an arcuate second flange means having a second upper arcuate flange surface and a second lower arcuate flange surface; a second outer clutch pad means attached to said second upper arcuate flange surface and a second inner clutch pad means attached to said second lower arcuate flange surface; at least one spring means connected to said first generally semi-circular clutch body and to said second generally semi-circular clutch body for biasing said first clutch body and said second clutch body together in a circular configuration; said first tongue seats into said second lug recess and said second tongue seats into said first lug recess when said first clutch body and said second clutch body are biased together in contact; said arcuate first flange means is off-set from said first web support means; and said arcuate second flange means is off-set from said second web support means.

2. The clutch means of claim 1 wherein said first flange means and said first web means are essentially L-shaped in vertical cross-section.

3. The clutch means of claim 2 wherein said second flange means and said second web means are essentially L-shaped in vertical cross-section.

4. The clutch means of claim 3 comprising a pair of spring means.

5. An energy source means which will supply electric current and compressed air comprising a drive means; a first drive shaft means engaged to said drive means in order to be rotated thereby; a face plate means bound to said first drive shaft means in order to rotate therewith; a clutch means pivotally mounted to said face plate means such as to respond to centrifugal force; said clutch means comprising a first generally semi-circular clutch body terminating at one end into a first lug means having a first lug aperture and a first lug recess and terminating at another end into a first tongue, a first bolt means slidably disposed through said first lug aperture and engaged to said face plate means such that said first clutch body pivots about said first bolt means with centrifugal force; said first generally semi-circular clutch body having a structure defining a first web support means integrally bound to an arcuate first flange means having a first upper arcuate flange surface and a first lower arcuate flange surface; a first outer clutch pad means attached to said first upper arcuate flange surface and a first inner clutch pad means attached to said first lower arcuate flange surface; a second generally semi-circular clutch body terminating at one end into a second lug means having a second lug aperture and a second lug recess and terminating at another end into a second tongue, a second bolt means slidably disposed through said second lug aperture and engaged to said face plate means such that said second clutch body pivots about said second bolt means with centrifugal force; said second generally semi-circular clutch body having a structure defining a second web support means integrally bound to an arcuate second flange means having a second upper arcuate flange surface and a second lower arcuate flange surface; a second outer clutch pad means attached to said second upper arcuate flange surface and a second inner clutch pad means attached to said second lower arcuate flange surface; at least one spring means connected to said first generally semi-circular clutch body and to said second generally semi-circular clutch body for biasing said first clutch body and said second clutch body together in a circular configuration; a second drive shaft means having an end rotatably positioned within said circular configuration such that the outside circumferential surface of said end of said second drive shaft means is engaged by said first inner clutch pad means and said second inner clutch pad means when said face plate means is being rotated at low revolutions by said drive means; a third drive shaft means having a hollow structure and concentrically positioned around said second drive shaft means; said third drive shaft means having a hollow end rotatably positioned around said circular configuration such that the inside circumferential surface of said hollow end of said third drive shaft means is engaged by said first outer clutch pad means and said second outer clutch pad means when said face plate means is being rotated at high revolutions by said drive means; a generator means engaged to said third drive shaft means to generate electricity; and an air compressor means engaged to said second drive shaft means to compress air; said second drive shaft means is hollow, and said clutch means comprises a pair of spring means, and said first drive shaft means extends through said face plate means and extends between said pair of spring means and through said hollow second drive shaft means; said arcuate first flange means is off-set from said first web support means; and said arcuate second flange means is off-set from said second web support means.

6. The energy source means of claim 5 wherein said first flange means and said first web means are essentially L-shaped in vertical cross-section.

7. The energy source means of claim 6 wherein said second flange means and said second web means are essentially L-shaped in vertical cross-section.

8. The energy source means of claim 7 additionally comprising first bearing means disposed between said third drive shaft means and said second drive shaft means, and a second bearing means disposed between said first drive shaft means and said second drive shaft means.

9. The energy source means of claim 8 additionally comprising a bearing support means, and a third bearing means supported by said bearing support means and engaged around said third drive shaft means.

10. The energy source means of claim 9 wherein said hollow end of said third drive shaft means flanges outwardly such that the diameter of the hollow end is larger than the diameter of the remaining part of said hollow third drive shaft means, and said end of said second drive shaft means flanges outwardly such that the diameter of the end of the second drive shaft means is larger than the diameter of the remaining part of said second drive shaft means.

* * * * *